(12) United States Patent
Bux et al.

(10) Patent No.: US 7,665,379 B2
(45) Date of Patent: Feb. 23, 2010

(54) GEAR TRAIN ELEMENT FOR PLAY-FREE TORQUE TRANSMISSION

(75) Inventors: Harald Bux, Huettlingen (DE); Anton Paweletz, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 526 days.

(21) Appl. No.: 10/415,895

(22) PCT Filed: Nov. 3, 2001

(86) PCT No.: PCT/DE01/04145

§ 371 (c)(1),
(2), (4) Date: May 6, 2003

(87) PCT Pub. No.: WO02/40897

PCT Pub. Date: May 23, 2002

(65) Prior Publication Data

US 2004/0035230 A1    Feb. 26, 2004

(30) Foreign Application Priority Data

Nov. 16, 2000  (DE) ................. 100 57 117
May 21, 2001   (DE) ................. 101 24 601

(51) Int. Cl.
*F16H 55/18*  (2006.01)
*F16H 57/00*  (2006.01)
*F16H 1/16*   (2006.01)
*F16H 1/20*   (2006.01)

(52) U.S. Cl. ................. 74/411; 74/409; 74/425
(58) Field of Classification Search .......... 74/411, 74/409, 440, 443, 425, 89.14
See application file for complete search history.

(56) References Cited

U.S. PATENT DOCUMENTS

| | | | | |
|---|---|---|---|---|
| 3,147,640 A | * | 9/1964 | Walton | 74/640 |
| 3,635,100 A | | 1/1972 | Littman | |
| 3,851,538 A | * | 12/1974 | Denkowski et al. | 74/425 |
| 4,449,213 A | | 5/1984 | Noborimoto et al. | |
| 5,513,543 A | * | 5/1996 | Carlson et al. | 74/527 |
| 6,520,042 B2 | * | 2/2003 | Jammer et al. | 74/425 |

FOREIGN PATENT DOCUMENTS

| | | |
|---|---|---|
| DE | 197 13 423 | 11/1997 |
| FR | 712 311 | 9/1931 |
| JP | 57-103131 | 6/1982 |
| JP | 04039456 | 2/1992 |
| JP | 33-005523 | 5/2002 |

* cited by examiner

*Primary Examiner*—Thomas R Hannon
*Assistant Examiner*—Justin Krause
(74) *Attorney, Agent, or Firm*—Michael J. Striker

(57) ABSTRACT

The invention relates to a gear train element in a gear train arrangement (5, 18), said gear train element (5) being driven on the drive side by a drive motor (1), on whose power take-off shaft (2) the gear train element (5) is mounted. The peripheral surface of the gear train element (5) is provided with a toothed gearing (7), and said element meshes with one or more toothed gearings of additional gear train elements (18). Axially displaceable and adjustable support elements (11, 12; 33, 34, 35, 36) and sleeve-type followers (13, 14; 30, 31) are mounted between the power take-off shaft (2) and a set of springs (8) and also between the set of springs (8) and the gear train element (5).

12 Claims, 5 Drawing Sheets

Fig. 3.1
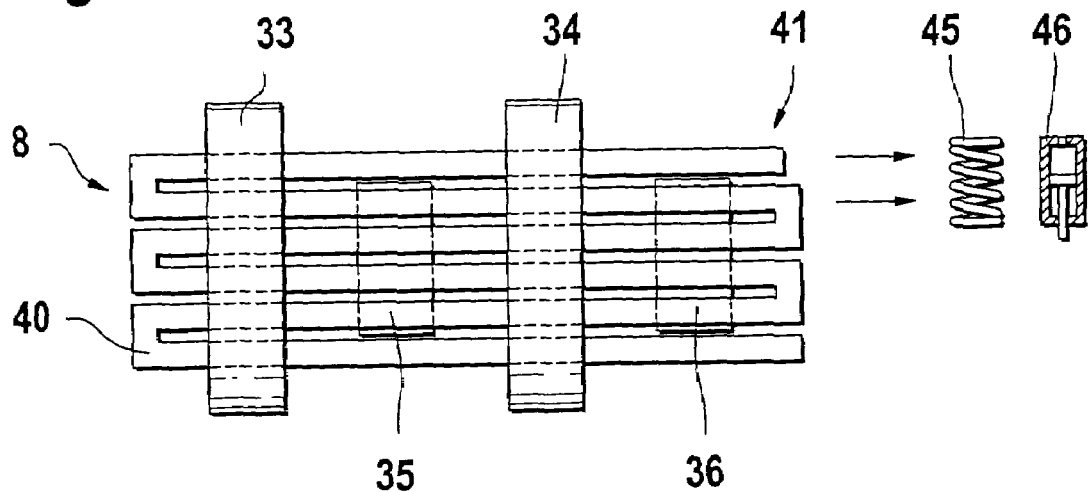
Fig. 3.1.1
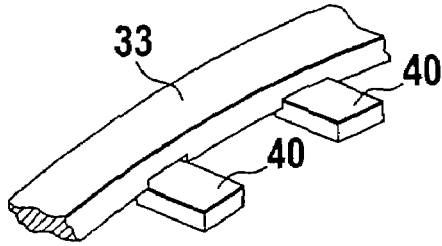
Fig. 3.1.2
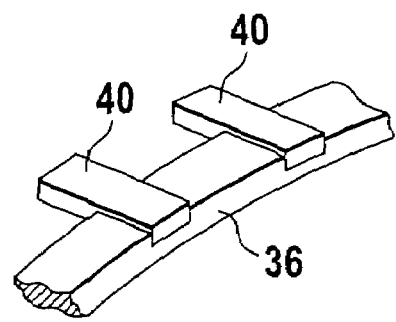
Fig. 3.2
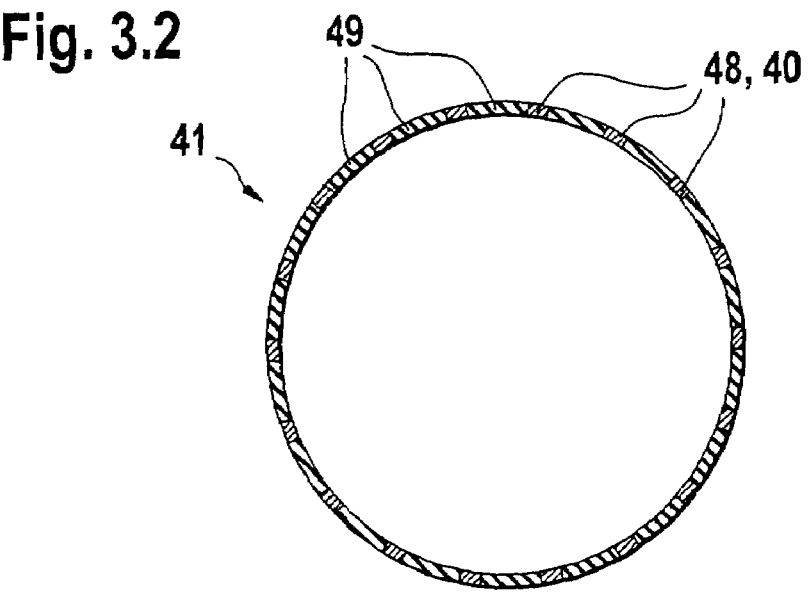

Fig. 3.3
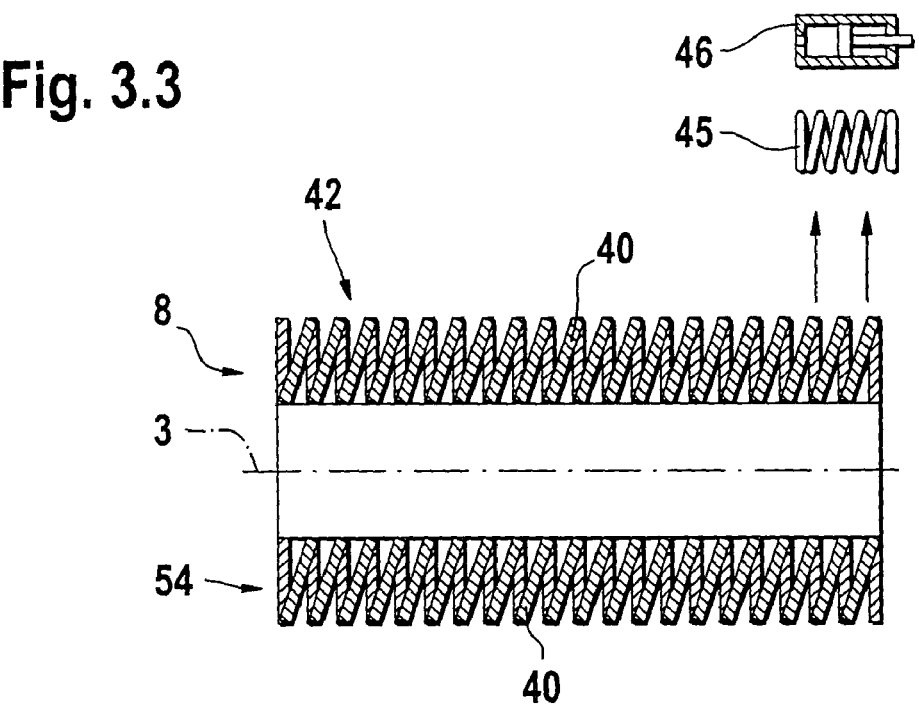
Fig. 3.4
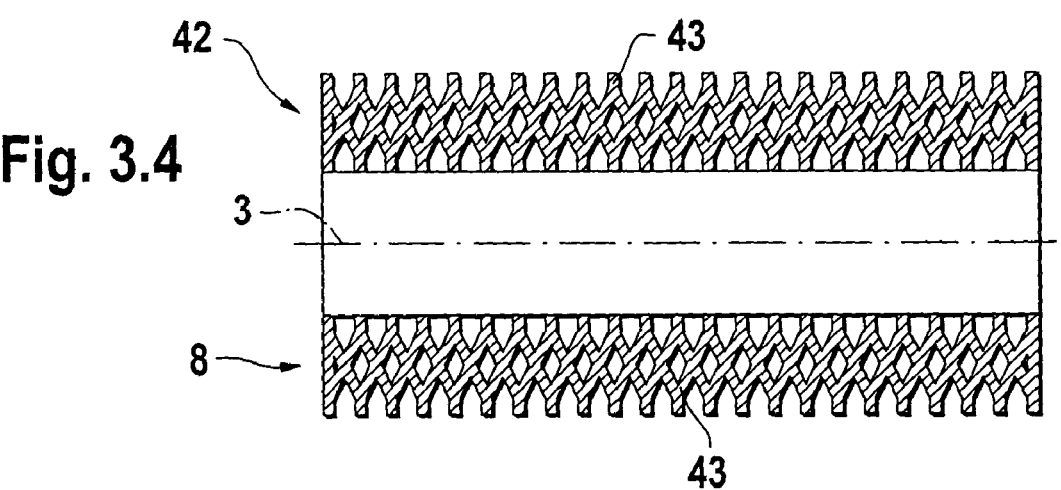
Fig. 3.5
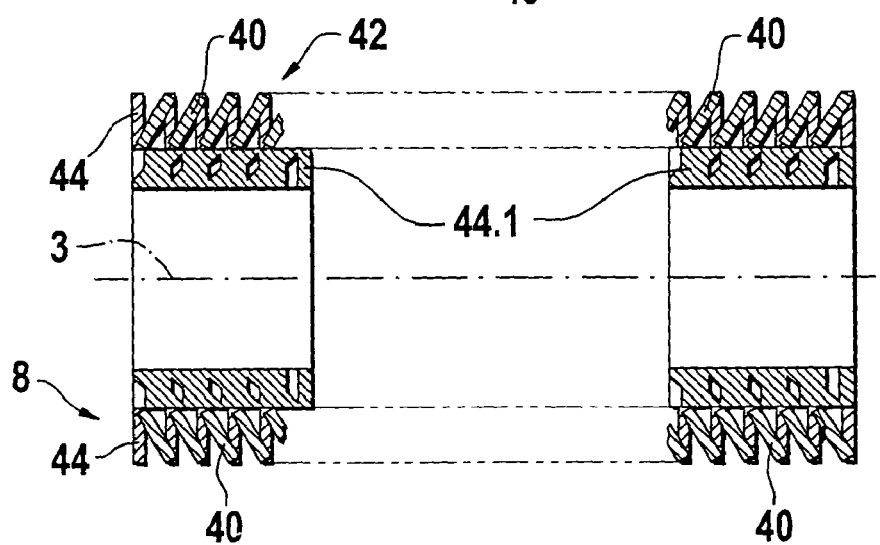

GEAR TRAIN ELEMENT FOR PLAY-FREE TORQUE TRANSMISSION

BACKGROUND OF THE INVENTION

Drive elements having independent rotational axes are used in gear trains for transmitting torque. Coupling elements can be installed between these drive elements, or rather torsion elements can be provided. The positions of the respective axes of the gear train arrangement, such as sliding shaft coupling and motor drive, change their rotational axes to differing extents due to production tolerances, wear and temperature influences, also depending on the material used.

PRIOR ART

The requirements placed on gear train arrangements include—in addition to a high level of reliability, low noise, and long service life—the absence of play. The criterium of absence of play means that elements keep their positions well; in worm drives with drive shafts disposed so that they are offset by 90° relative to each other, the self-locking effect is paramount, that is, once a meshed position of the drive elements is selected, it cannot be changed by the influence of the load moment from the spur gear.

Absence of play in gear train arrangements substantially decreases the amount of mechanical strain placed on tooth flanks, especially on straight-cut spur gears, which could cause them to bend. This applies to a limited extent for helical gears as well. Absence of play in gear train arrangements is usually obtained by the use of torsion springs, e.g., by the use of torsion bars in the automotive industry. Due to their fitted length, however, torsion bars usually require a considerable amount of space for installation, particularly length.

Moreover, the requirement of zero backlash in a gear train arrangement is accompanied by the requirements for great radial resilience with the simultaneous presence of great torsional and axial rigidity between meshed gears. If couplings and torsion bars are used in gear train arrangements, backlash and bending properties add up in unfavorable fashion, so that absence of play can be ensured only by employing high preloads. This, in turn, requires that components be used that produce the highest levels of initial torque. Components of this nature take up space, so the requirements of compact-sized and play-free gear train arrangements cannot be adequately fulfilled.

SUMMARY OF THE INVENTION

With the means proposed according to the invention, the elasticity of the power take-off can be fully integrated in a gear train element. This allows the space required to provide coupling elements and torsion bars to be drastically reduced. The means according to the invention comprise a set of springs that can comprise one or more flat springs arranged concentrically relative to each other. The individual flat springs comprise a number of lamellae, followers and/or support elements extending vertically or horizontally.

The set of springs accommodated in a bore of the gear train element by means of an elastic power take-off element can be supported in this bore by means of sleeves with supporting sections accommodated in annular gaps between the set of springs and power take-off element or between power take-off shaft and the set of springs, or by means of sliding fits displaceably supported in these annular gaps. By means of the sliding fits displaceably mounted on the power take-off shaft of an electrical drive, the power flow can be specified in terms of the transverse deflection of the power take-off shaft of the elastic drive, and the radial rigidity can be adjusted.

By means of the followers, which can be designed as annular sleeves, for example, the power flow of the drive torque through the power take-off shaft to the power take-off element can be influenced and varied. The followers allow a frictional or form-fit connection for the transmission of torque, and they allow the radial rigidity of the power take-off shaft/power take-off element component combination to be adjusted and varied within limits.

Depending on the requirements for the absence of play and the torque to be transmitted, the means according to invention can enable the desired radial rigidity to be adjusted for the specific application by adjusting the sliding fits between the set of springs and power take-off shaft of the electric drive. No additional space is required with regard for the axial length of the power take-off shaft; the bending force gradient can be set to a desired grading according to predetermined adjustment increments of the sliding fits in the axial direction.

It is possible to adjust the maximum deflection using simple means by means of stops on the gear train element, be it a worm or a straight-cut or helical gear.

The set of springs can be constructed of lamellae oriented approximately perpendicular to or horizontal with the drive axis. In the case of a perpendicular arrangement, said lamellae can be designed as flat springs or as wrapped profiled elements, for example. Furthermore, the set of springs can be designed as a combination of alternately layered, concentrically arranged flat springs. Finally, it is possible to use flat springs wrapped multiple times, in the case of which the contact surfaces of adjacent lamellae represent a possibility for damping increasing oscillations in timely fashion by the fact that adjacent lamellae rub together.

The components proposed according to the invention, namely, a set of springs, followers and sliding fits, permit the parameters of the gear train element that are optimal for the respective application in terms of absence of play, the level of torque to be transmitted, and radial rigidity to be adjusted in optimum fashion.

BRIEF DESCRIPTION OF THE DRAWINGS

The invention will be described in greater detail hereinbelow with reference to drawings.

DESCRIPTION OF THE PREFERRED EMBODIMENTS

Figure 1:
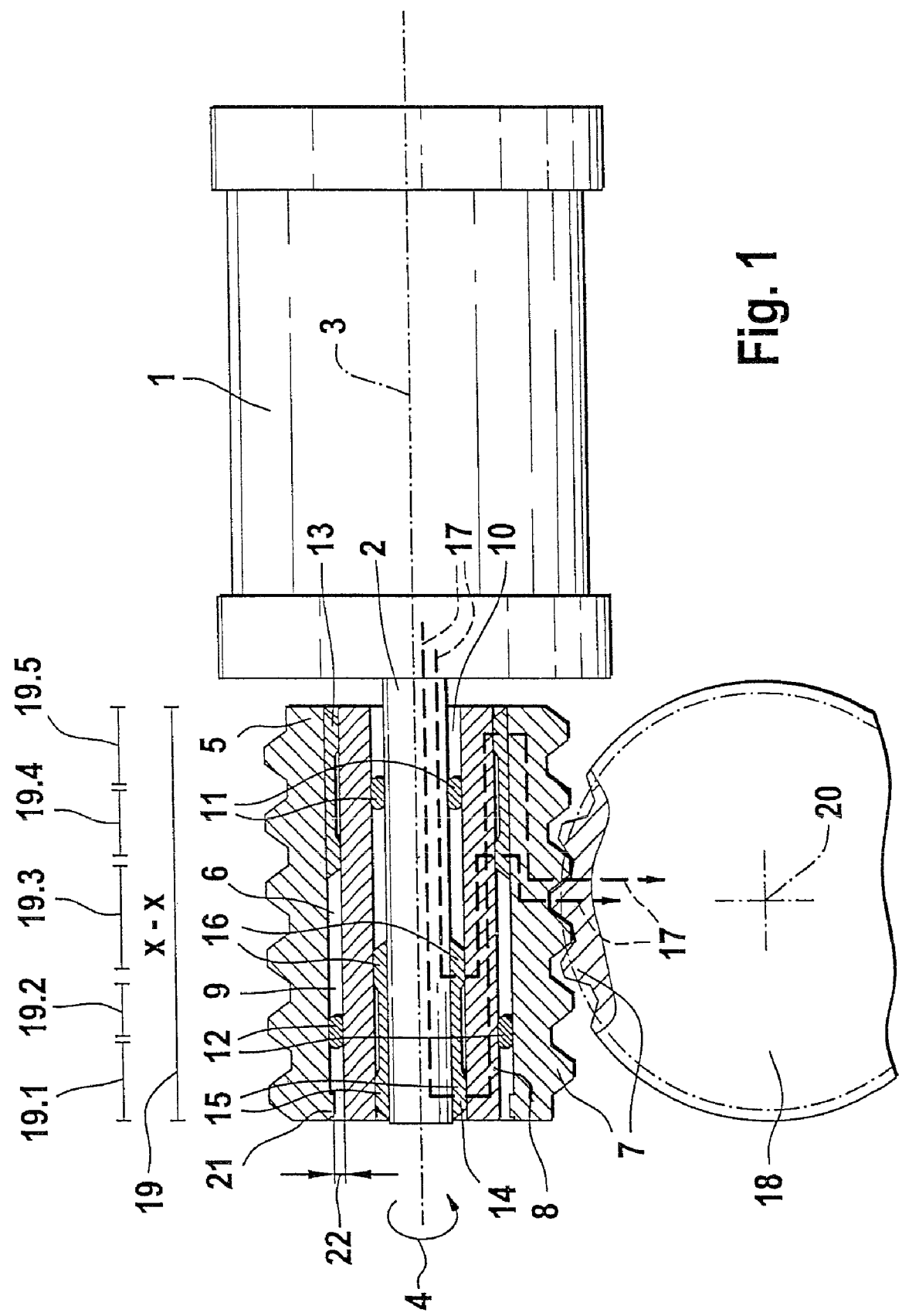
FIG. 1 shows a drive assembly with gear train element of an electrical drive shown in a sectional view.

FIG. 1 shows a drive assembly with drive element of an electrical drive shown in a sectional view.

According to the depiction in FIG. 1, the gear train element 5 configured according to the invention is mounted on a power take-off shaft 2 of a drive motor 1, such as an electrical drive, for example. The power take-off shaft 2 of the electrical drive 1 rotates in the direction of rotation 4 around the symmetry axis 3. The gear train element 5 has a bore 6 extending through it in the axial direction in which a set of springs 8, sleeve-type followers 13 and 14, and support elements 11 and 12 are accommodated.

A support element 11 in the form of a sliding fit is accommodated—in a manner that allows it to move in the axial direction along an adjustment path labelled with reference numeral 19—on the outside of the power take-off shaft 2 extending through the bore 6 of the gear train element 5 on the side closest to the electrical drive 1. Furthermore, the power take-off shaft 2 of the electrical drive 1 is encircled by a sleeve-type follower 14. Two annular supporting sections identified with reference numerals 15 and 16 are located on the outside of the sleeve-type follower 14, which said supporting sections face toward the inside of the set of springs 8. The set of springs 8 itself is composed of a large number of lamellae 40, which will be described in greater detail hereinbelow.

A support element 12—that is displaceable as well—in the form of a sliding fit is located on the outside of the set of springs 8 at the free end of the drive shaft 2 and set of springs 8. Its maximum potential displacement according to the adjustment path 19 for adjusting the radial rigidity of the combination of gear train elements 5 and power take-off shaft 2 of the electrical drive 1 is determined by a stop 21 that is located at a gap width from the free end of the set of springs 8 indicated by reference numeral 22. The set of springs 8 is furthermore encircled by a follower 13 having an annular shape, the ring-shaped supporting sections of which face toward the outer peripheral surface of the set of springs 18. The follower 13—with its continuous flat side—rests against the inside of the bore 6 of the gear train element 5, which said gear train element is equipped with a toothed gearing 7 on its outer circumference. The toothed gearing 7 can be a worm-like toothed gearing; furthermore, it can be designed as a spur gear or a helical gear. Via the toothed gearing 7 formed on the outer circumference of the gear train element 5, the torque exerted by the electrical drive 1 via its power take-off shaft 2 in the rotational direction 4 can be transmitted to a toothed gearing of a further power take-off element 18 meshing with the gear train element 5, which said power take-off element is designed as an externally-toothed worm gear in the exemplary embodiment according to FIG. 1. The worm gear 18 rotates around a rotational axis 20 that is offset by 90° relative to the power take-off shaft 2 of the electrical drive 1. Given an appropriate geometry of the toothed gearing or pitch of the worm, a high degree of self-locking can be obtained with the gear train element 5 created according to the invention, and with the worm gear 18.

In relation to the symmetry line 3 of the power take-off shaft 2 of the electrical drive 1, the adjustment path 19 is subdivided into a large number of adjustment increments 19.1, 19.2, 19.3, 19.4 and 19.5 in which the support elements 11 and 12 and the followers 13 and 14 are capable of being displaced in a cavity 9 surrounding the set of springs 8 in the shape of a ring, that is, in the outer annular gap 9 in the axial direction or in an inner annular gap 10. If the support elements 11 and 12 configured as sliding fits are displaced in their positions corresponding to adjustment increments 19.1 and 19.4, a bending characteristic ensues that can be optimum for a certain application. Through the axial extension of the annular gaps 9 and 10, the axial displaceability of the sliding fits 11 and 12—functioning as support elements—in their respective annular gaps 9 and 10 is limited only by the outer stop 21 that limits the maximum displaceability in the axial direction of the sliding fit 12 displaceably accommodated in the outer annular gap 9.

The torque flow that occurs through the arrangement of the followers 13 and 14 configured in the shape of sleeves is indicated by the dashed lines that are labelled with reference numeral 17 and represent the power flow from the power take-off shaft 2 of the electrical drive 1 via the inner sleeve-type follower 14 into the set of springs 8 and, from here, into the outer follower 13 accommodated in the outer gap 9. From the outer follower 13, resting against the inner wall of the bore 6 extending through the gear train element 5, the torque is transmitted via the external toothed gearing 7 of the gear train element 5 to the external toothed gearing of the further gear train element 18 configured as a worm gear in the representation according to FIG. 1, so that the torque can finally overcome the load moment on the worm gear 18.

Figure 2:
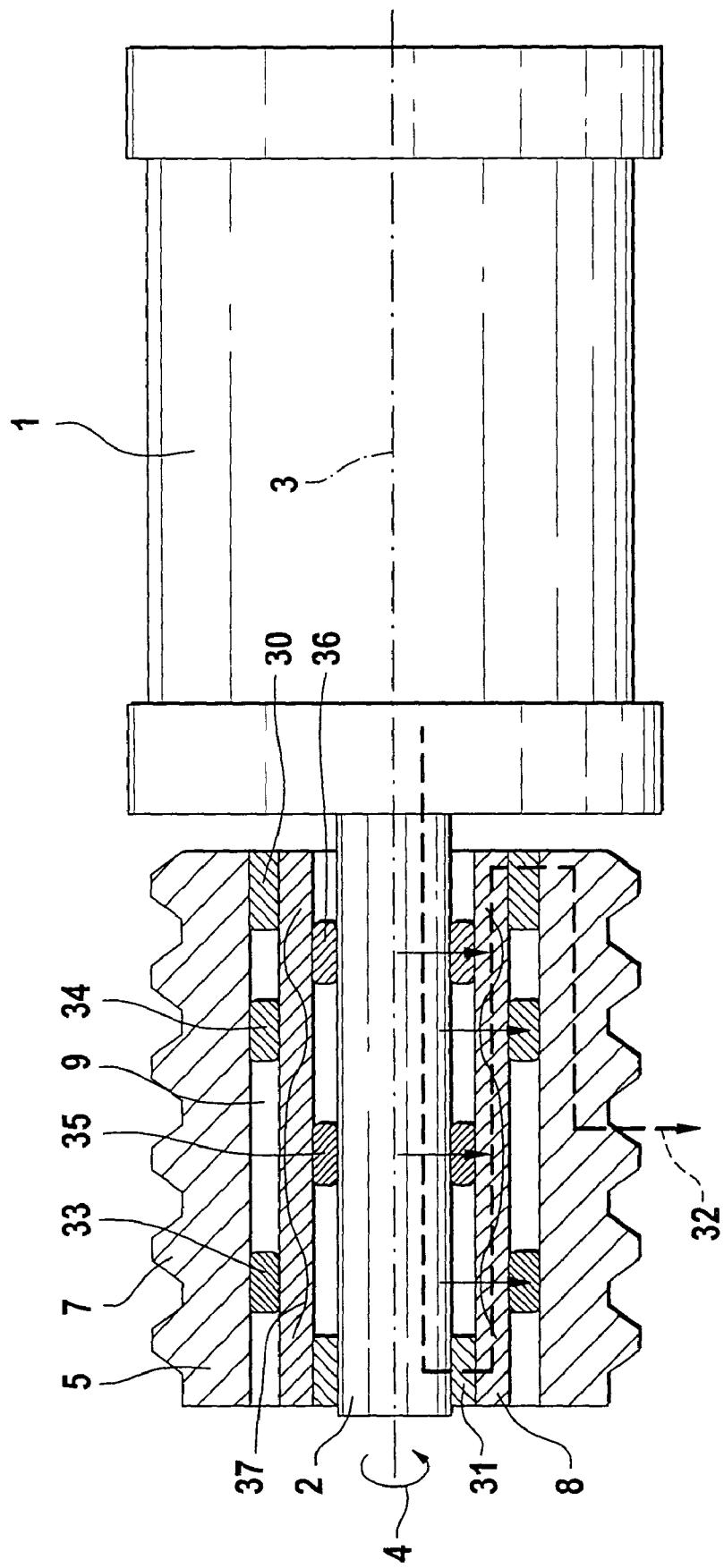
FIG. 2 is a drive element with a set of springs equipped with sliding fits on the outside and inside for adjusting the radial rigidity, FIG. 3.1 is the schematic diagram of a set of springs with lamellae oriented in parallel, FIGS. 3.1.1 and 3.1.2 show form-fit connections between a sliding fit and lamellae extending at a right angle thereto, FIG. 3.2 shows lamellae strands embedded in circumferential segments in a parallel arrangement, extending at a right angle to the plane of the drawing, FIG. 3.3 shows a set of springs with lamellae in a perpendicular arrangement, FIG. 3.4 shows a set of springs with wrapped profiled elements, FIG. 3.5 shows a concentrically arranged set of flat springs designed annular in shape.

A set of springs is shown in the depiction according to FIG. 2. Said set of springs is equipped with sliding fits on the outside and inside for adjusting the bending line of the combination gear train element/power take-off shaft of an electrical drive.

Analogous to the depiction in FIG. 1, an electrical drive 1 is shown in FIG. 2, the power take-off shaft 2 of which rotates around the symmetry line 3 in the rotational direction 4. Unlike the depiction according to FIG. 1, the set of springs 8 according to the representation in FIG. 2 is supported on the outer peripheral surface of the power take-off shaft 2 by means of the support elements 35 and 36 which are also designed as sliding fits capable of being displaced in their respective gap 10 in a manner analogous to that depicted in FIG. 1. Two support elements 33 and 34 are also accommodated on the outer side of the set of springs 8 according to the representation in FIG. 2, which said support elements are displaceable in the axial direction in the outer annular space 9 between set of springs 8 and gear train element 5. The followers according to the representation in FIG. 2 are labelled with reference numerals 30 and 31 and are accommodated in the outer annular gap 9 and in the inner annular gap 10. Via the followers 30 and 31, the torque applied by the electrical drive 1 via the power take-off shaft 2 is transmitted via the interposed set of springs 2 to the external toothed gearing 7 of the gear train element 5.

A bending line identified with reference numeral 37 is drawn in the representation according to FIG. 2, which said bending line is defined by the selected arrangement of support elements 33 and 34 in the outer annular ring 9 and by the position of the sliding fits 35 and 36—functioning as support elements—in the inner annular gap 10. According to the power flow of the bending forces, which is defined by reference numeral 32 in FIG. 2, a course of the torque sets in via the rotationally driven power take-off shaft 2 via the inner follower 31 into the set of springs 8. The torque is transmitted in a fashion analogous to FIG. 1 via the outer follower 30, accommodated in the outer annular gap 9 between set of springs 8 and the bore 6 of the gear train element 5, into said gear train element, and via the toothed gearing 7 into a further gear train element not shown here.

The course identified with reference numeral 37 shows the bending line that results from the transmission of bending forces via the sliding support elements 35 and 36 located in the inner annular gap 10 and via the support elements 33 and 34 accommodated in the outer annular gap 9 to the gear train element 5.

The schematic diagram of a set of springs with lamellae oriented in parallel is shown in the depiction according to FIG. 3.1.

The depiction according to FIG. 3.1 is a highly schematized diagram depiction of a set of springs 8. The set of springs 8 comprises a continuous lamella arrangement disposed in a parallel arrangement 41. The support elements shown in FIG. 2 are located on the outside of the lamella arrangement in the form of sliding fits 33 and 34. The support elements—also created as sliding fits 35, 36—accommodated between set of springs 8 and not-shown power take-off shaft 2 of the electrical drive 1 are covered by the lamellae 40 oriented in a parallel arrangement 41. The lamellae 40 according to the depiction in FIG. 3.1 are a one-piece component that is imparted with a characteristic of a spring/damping element 45, 46 by the selection of displaceably arranged support elements 33, 34, 35 and 36, depending on the axial orientation of the support elements 33 through 36. The following action could also be improved recesses or structures in or on the sliding fits 33 and 34 not shown here, which said recesses or structures could be matched to the lamellae 40, 41 in form-fit fashion. According to FIGS. 3.1.1 and 3.1.2, a form-fit connection between the support elements 33, 34, 35 and 36 and an endless lamella can be improved by providing recesses on the underside of the support elements 33 and 34, 35 or 36 that accept the sections of the lamella 40 (FIG. 3.1.1). On the other hand, it is also possible to provide recesses on the top side of a support element 36, through which the sections of the lamellae 40 extend. This makes it possible to improve the response behavior during damping.

The depiction according to FIG. 3.2 shows the parallel arrangement of lamella strands embedded in the circumferential segments of a set of springs that extend at a right angle to the plane of the drawing.

The set of springs 8 embodied here in a cylinder configuration comprises individual elastomer segments 49 in which the individual lamella strands of the continuous lamella 40 according to the schematic diagram in FIG. 3.1 extend in the axial direction. The course of the lamellae, that is, parallel to the symmetry line 3 of the power take-off shaft 2 of the electrical drive 1, extends at a right angle into and at a right angle out of the plane of the drawing. The lamellae 40 are accommodated play-free in the elastomer segments 49 of the set of springs 8.

The depiction according to FIG. 3.3 shows a set of springs with lamellae in a vertical arrangement.

According to this depiction, the set of springs 8 comprises individual lamella 40 oriented in the vertical position 42 that can be designed in the form of a slotted bar, for example. In the depiction according to FIG. 3.3, the lamellae 40 of the set of springs 8 are arranged at a slight slant, and they are designed as flat springs extending across the entire axial length of the power take-off shaft 2 of the electrical drive 1. The selected lamellar arrangement 40 shown in the depiction according to FIG. 3.3 in the vertically-oriented position 42 imparts the set of springs 8—as viewed in the radial direction—with a certain spring damping characteristic, indicated by the spring damper arrangement 45, 46—on which forces acting in the radial direction act.

According to the depiction in FIG. 3.4, the set of springs 8 can also be designed as an arrangement of wrapped profiled elements 43 developed in the axial direction parallel to the symmetry axis 3 of the power take-off shaft 2 of the electrical drive 1. The profiled elements 43 can be wrapped profiled elements that, overlapping each other, extend in the axial direction along the adjustment path 19 of the power take-off shaft 2 of the electrical drive 1. Due to the cavities extending between the individual wrapped profiled elements 43, this exemplary embodiment of a set of springs 8 has a great deal of elasticity. Depending on the application in which the gear train element 5 designed according to the invention is used, this can be entirely desirable.

In contrast to the depictions according to FIGS. 3.3 and 3.4, a concentrically arranged set of springs comprising a plurality of individual flat springs is shown in the depiction according to FIG. 3.5.

An external flat spring 44 that is coaxial with the symmetry axis 3 of the power take-off shaft 2 of the electric drive 1 is shown, the lamellae 40 of which are arranged essentially in a perpendicular position relative to the symmetry axis 3 of the driven power take-off shaft 2 (not shown here) of the electrical drive 1. The external flat spring 44 extends continually across the entire length of the power take-off shaft 2 of the electrical drive 1 and is shown interrupted in the middle to enhance clarity. An internal spring element 44.1 is located underneath the external flat spring 44, the lamellae 40 of which are oriented essentially in a perpendicular position 42. According to the depiction shown in FIG. 3.5, this spring element 44.1 can be located only in the start region and in the end region of the outer flat spring 44 having a continuous design. The lying or internal spring elements 44.1 are arranged concentrically with the external flat spring element 44. By making a proper selection in terms of the slots in the lamellae 44 and/or in terms of the axial length of the internal flat spring elements 44.1, a rigidity characteristic can be obtained with this combination arrangement that is better suited for special applications than the set of springs configurations according to the depiction in FIGS. 3.3 and 3.4.

Figure 4:
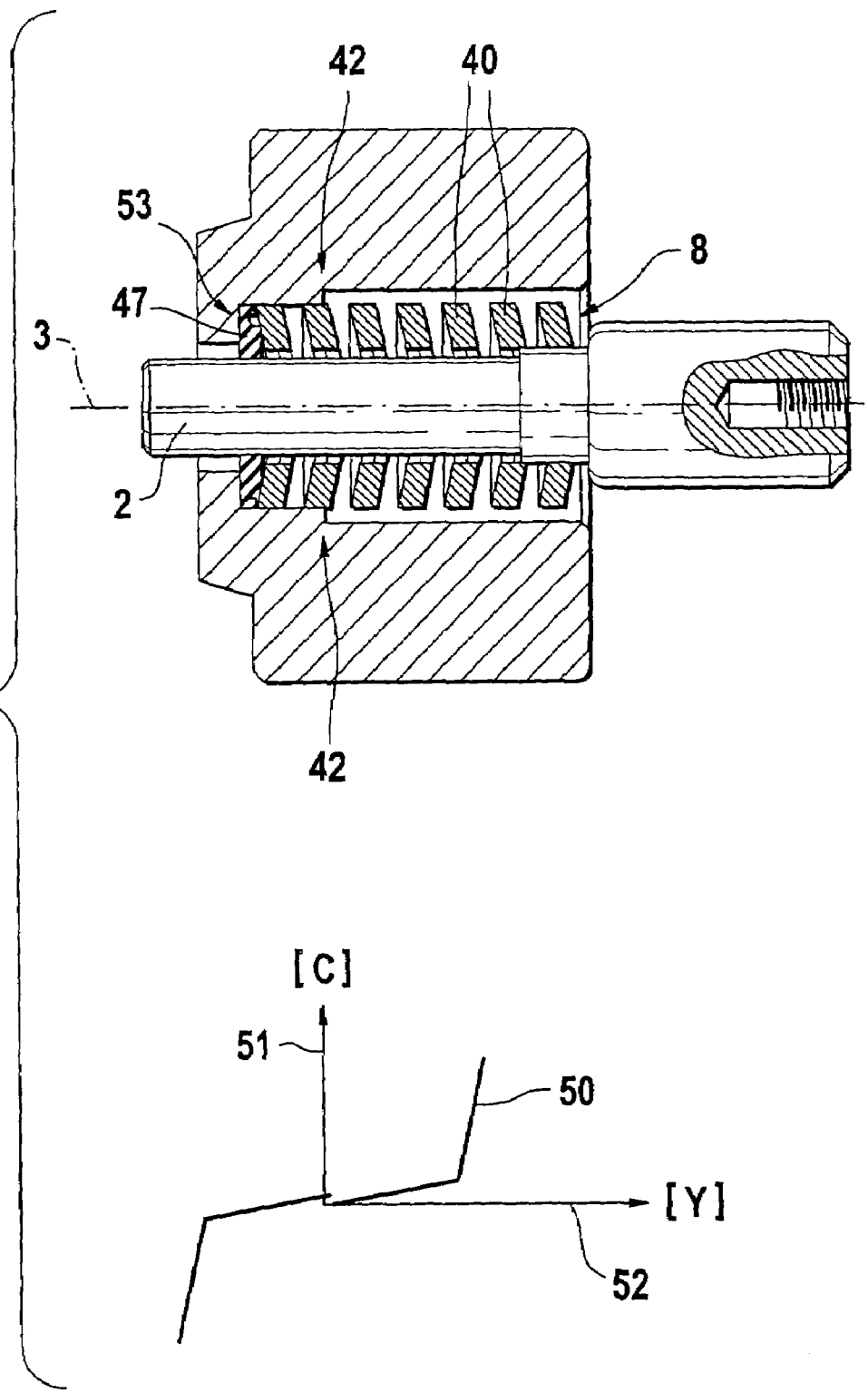
FIG. 4 shows an additional axial spring associated with a set of springs designed in the shape lamellae, including the characteristic curve for radial deflection.

The depiction in FIG. 4 shows, in greater detail, the disposition of an additional axial spring on a set of springs 8 and its characteristic curve when radial displacement occurs.

A power take-off shaft 2 of an electrical drive—not shown here in greater detail—is shown in the disposition according to FIG. 4 that is symmetrical to the symmetry line 3. The power take-off shaft 2 of the electrical drive 2 not shown here in greater detail is encircled by a set of springs 8, the individual lamellae 40 of which are accommodated substantially in a vertical orientation 42. In contrast to the set of springs 8 described hereinabove with reference to the depictions in FIGS. 3.1, 3.2, 3.3, 3.4 and 3.5, an additional spring element 47 acting in the axial direction is associated with the set of springs 8 according to the exemplary embodiment in FIG. 4. The additional axial spring element 47 rests—with one spring shoulder 53—against the gear train element 5 encircling it. This exemplary embodiment makes it possible, due to the contact and friction between the individual adjacent lamellae 40, to counteract the build-up of potential oscillations and provide damping accordingly. An asymmetry of spring rigidity and damping occurring due to directional dependence of spring rigidity and damping in the set of springs (it is substantially greater when pressed in the axial direction than when pulled in the axial direction) can be counteracted by adding the additional spring element 47. The spring 47—which also exerts an axial spring force—is accommodated in a very small gap between the power take-off shaft 2 and the toothed gearing of the gear train element 5.

With the proposed means, the elasticity is integrated nearly completely in a gear train element, whereby the concept contains a combination of lamellae 40, followers 13, 14 and 30 and 31, as well as support elements 11 and 12, and 33, 34, 35 and 36. A network of spring and damping elements can be configured using the elements listed, whereby the rigidity in the radial direction in accordance with the diagram shown in FIG. 4 depending on the radial deflection 42 is accompanied by a considerable increase in pressing force 51, as indicated by the course of the rigidity 50 according to the depiction in FIG. 4. The desired radial rigidity can be determined, therefore, by displacing the support elements 11, 12, 33, 34, 35 and 36 accordingly in certain adjustment increments 19.1 through 19.5 along the axial adjustment path 19 without the dimensions of the gear train element 5 changing substantially.

REFERENCE NUMERALS

1 Electrical drive
2 Power take-off shaft
3 Symmetry line
4 Direction of rotation
5 Gear train element
6 Bore
7 External toothed gearing
8 Set of springs
9 Outer annular gap
10 Inner annular gap
11 Inner sliding fit
12 Outer sliding fit
13 Outer follower
14 Inner follower
15 First ring segment
16 Second ring segment
17 Power flow
18 Further power take-off element (worm gear)
19 Adjustment path
19.1 Adjustment increments
19.2 Adjustment increments
19.3 Adjustment increments
19.4 Adjustment increments
19.5 Adjustment increments
20 Axis of rotation
21 Stop
22 Gap width
30 Outer follower
31 Inner follower
32 Power flow of torque
33 Support element
34 Support element
35 Support element
36 Support element
37 Bending line
40 Lamellae
41 Parallel lamellar arrangement
42 Vertical lamellar arrangement
43 Wrapped profiled element
44 Concentric flat spring
44.1 Concentric internal flat spring
45 Spring
46 Damping
47 Additional axial spring element
48 Elastomer embedding
49 Segment
50 Course of the rigidity
51 Pressing force
52 Radial displacement
53 Spring shoulder
54 Flat spring

What is claimed is:

1. A gear train element in a gear train arrangement (5, 18) that is driven on a drive side via a drive motor (1) on the power take-off shaft (2) of which the gear train element (5) is mounted, with a set of springs (8) being arranged between the power take-off shaft (2) and the gear train element (5), which said gear train element is provided with an external toothed gearing (7) on its peripheral surface and meshes with one or more toothed gearings of additional gear train elements (18),
wherein axially adjustable support elements (11,12; 33, 34, 35, 36) and sleeve shaped followers (13, 14; 30, 31) are accommodated between the power take-off shaft (2) and the set of springs (8), and between the set of springs (8) and the gear train element (5).

2. The gear train element according to claim 1,
wherein the axially adjustable support elements (11, 12; 33, 34, 35, 36) and the sleeve shaped followers (13, 14; 30, 31) are accommodated in cavities (9, 10) designed in a shape of annular gaps.

3. The gear train element according to claim 1,
wherein a stopping face (21) is formed on the gear train element (5) that limits a maximum axial displacement of the support elements (11, 12; 33, 34, 35, 36).

4. The gear train element according to claim 1,
wherein the gear train element (5) has an axial length which is subdivided into individual adjustment increments (19.1 through 19.5) subdividing an adjustment path (19).

5. The gear train element according to claim 1
wherein the followers (13, 14) comprise annular supporting sections (15, 16) that rest against the set of springs (8) on its inside and/or its outside.

6. A gear train element in a gear train arrangement (5, 18) that is driven on a drive side via a drive motor (1) on the power take-off shaft (2) of which the gear train element (5) is mounted, which said gear train element is provided with an external toothed gearing (7) on its peripheral surface and meshes with one or more toothed gearings of additional gear train elements (18),
wherein axially adjustable support elements (11, 12; 33, 34, 35, 36) and sleeve-shaped followers (13, 14; 30, 31) are accommodated between the power take-off shaft (2) and a set of springs (8). and between the set of springs (8) and the gear train element (5),
wherein the set of springs (8) comprises lamellae (40) movable relative to each other, whereby the lamellae (40) act as a spring/damping element (45, 46).

7. The gear train element according to claim 6,
wherein the lamellae (40) are oriented substantially in a parallel position (41) relative to the power take-off shaft (2).

8. The gear train element according to claim 7,
wherein the lamellae (40) are embedded in elastomer segments (49) of the set of springs (8).

9. The gear train element according to claim 6,
wherein the lamellae (40) are oriented substantially in a perpendicular position (42) relative to the power take-off shaft (2).

10. The gear train element according to claim 6,
wherein the lamellae (40) in the set of springs (8) are designed as wrapped profiled elements (43).

11. The gear train element according to claim 6,
wherein the lamellae (40) in the set of springs (8) are arranged as concentric flat springs (44, 44.1).

12. The gear train element according to claim 6,
wherein an additional axial spring (47) is associated with the lamellae (40) of the set of springs (8).

* * * * *